United States Patent [19]

Yanagihara et al.

[11] Patent Number: 4,699,946

[45] Date of Patent: Oct. 13, 1987

[54] HYDROGEL FUNDAMENTAL MATERIAL

[75] Inventors: Yasukichi Yanagihara, Kakamigahara; Takuo Kato, Kasugai, both of Japan

[73] Assignee: Tomei Sangyo Kabushiki Kaisha, Nagoya, Japan

[21] Appl. No.: 712,814

[22] Filed: Mar. 18, 1985

[30] Foreign Application Priority Data

Mar. 24, 1984 [JP] Japan .................................. 59-56585

[51] Int. Cl.⁴ ............................................. C08L 67/06
[52] U.S. Cl. .................................... 524/539; 524/515; 525/10; 525/47; 525/419; 528/323
[58] Field of Search ........................... 525/10, 47, 419; 524/513, 539; 528/323

[56] References Cited

U.S. PATENT DOCUMENTS 4,002,700 1/1977 Fukuzaki et al. .................... 528/275
4,205,139 5/1980 Barzynski et al. .................... 525/47

FOREIGN PATENT DOCUMENTS

| 0219319 | 5/1983 | Japan .................................... 525/47 |
| 59-219319 | 5/1983 | Japan . |
| 838764 | 6/1958 | United Kingdom . |
| 1511563 | 6/1975 | United Kingdom . |
| 2055860 | 7/1980 | United Kingdom . |

Primary Examiner—John Kight
Assistant Examiner—M. L. Moore
Attorney, Agent, or Firm—Armstrong, Nikaido, Marmelstein & Kubovcik

[57] ABSTRACT

An optically transparent hydrogel forming material comprising a copolymer of an optically transparent polyester having a molecular weight of 1,000 to 100,000 and at least one of polymerizable group in its molecule and N-vinyllactam. The hydrogel forming material has an excellent optical property, high gas-permeability and excellent mechanical property.

6 Claims, No Drawings

HYDROGEL FUNDAMENTAL MATERIAL

BACKGROUND OF THE INVENTION

The present invention relates to a hydrogel forming material employed as a material for hydrogel having an excellent optical property, a high gas permeability and an excellent mechanical property.

Recently, a hydrophilic polymer has become popular with increase in application of polymer material to the field of medical industry. Especially, polymeric material which is not soluble in water and has a high water-absorbing property has been employed as materials of various films, including materials of films for medical use, catheters, canulas, water containing contact lenses, and the like.

With respect to the above hydrogel, the hydrogel has a tendency that the mechanical property suddenly lowers with increasing water content; and the higher gas permeability, the lower the transparency. Therefore, there has never been obtained a hydrogel which can sufficiently satisfy in optical property, gas permeability and mechanical property.

It higherto has been well-knonw that N-vinyllactam polymer has a high transparency and a high water solubility. Further it has been well-known that reinforcible ability of N-vinyllactam polymer is improved by copolymerizing N-vinyllactam and an alkyl ester of acrylic acid or methacrylic acid.

However, it is not easy to copolymerize N-vinyllactam and an acrylic acid or methacrylic acid. When N-vinyllactam is copolymerized with acrylic acid or methacrylic acid, it tends to give a mixture of 2 kinds of copolymers. That is to say, there are produced a copolymer of N-vinyllactam as a main component in which a few alkyl ester of acrylic acid or methacrylic acid is copolymerized, and a copolymer of alkyl ester of acrylic acid or methacrylic acid as a main component in which a few N-vinyllactam is copolymerized. When the copolymers contain water, they become cloudy and the mechanical properties of the copolymers are not satisfactory, because the copolymers tend to to phase-separate with each other.

There are proposed various methods of polymerization and cross-linking agents to dissolve the above-mentioned problems. For instance, N-vinyllactam and alkyl ester of acrylic acid or methacrylic acid are converted into a cross-linked copolymer of N-vinyllactam or a cross-linked copolymer of alkyl ester of acrylic acid or methacrylic acid by employing cross-linking agents which can easily cross-link each monomers to give a double cross-linked copolymer. And also, it is proposed a method employing cross-linking agents such as divinyl dicarboxylate, vinyl acrylate and vinyl methacrylate.

In accordance with the above-mentioned polymerization method, the polymerization form is complicated and further it is difficult to completely copolymerize the monomers and it is easy to elute an uncross-linked N-vinyllactam polymer. On the other hand, when divinyl dicarboxylate, vinyl acrylate or vinyl methacrylate is employed as a cross-linking agent, it is difficult to completely cross-link a polymer of N-vinyllactam. This difficulty is believed to occur because the vinyl group in the above-mentioned cross-linking agent has a low polymerizability in general to be apt to remain as an unpolymerized group, and therefore the vinyl group does not completely polymerize with N-vinyl group in N-vinyllactam.

It is an object of the present invention to provide a hydrogel having an excellent optical property, a high gas permeability and an excellent mechanical property.

A further object of the present invention is to provide a transparent hydrogel which is not cloudy at the time when the hydrogel is impregnated with water, that is to say, the hydrogel does not macroscopically occur phase-separation.

SUMMARY OF THE INVENTION

The present inventors have found a polyester having at least one of polymerizable group in its molecule, which is suitable to reinforce N-vinyllactam polymer, and the above-mentioned object can be attained by copolymerizing the above polyester and N-vinyllactam.

In accordance with the present invention, there can be provided an optically transparent hydrogel forming material comprising a copolymer of an optically transparent polyester which has a molecular weight of 1,000 to 100,000 and at least one of polymerizable group in its molecule and N-vinyllactam.

DETAILED DESCRIPTION

In the present invention, the water content of hydrogel can be increased by employing N-vinyllactam.

Also, physical properties of hydrogel can be improved by employing a polyester having a polymerizable group in its molecule, which is excellent in reinforcing the hydrogel. In that case, the polyester can be expected to more strongly reinforce the hydrogel in comparison with reinforcement using only a monomeric material, because the polyester itself is a polymeric material having a large molecular weight. Further, N-vinyllactam polymer can be effectively reinforced by employing the polyester having a polymerizable group which can be effectively copolymerized with a polymerizable group in N-vinyllactam, because the polyester having an excellent mechanical property is introduced into N-vinyllactam polymer. As a result, a hydrogel obtained by adding water into the hydrogel forming material of the present invention has an excellent mechanical property, and also the hydrogel is macroscopically homogeneous and phase-separation between a copolymer including N-vinyllactam as a main component and a copolymer including polyester as a main component as seen in prior art is not seen in the hydrogel of the present invention.

In the hydrogel forming material of the present invention, it is not clear in what form N-vinyllactam and polyester having polymerizable groups in its molecule are polymerized. Probably, it is considered that poly-N-vinyllactam chains and polyester chains are cross-linked to each other at the polymerizable groups of each chain. In that case, when the polyester chain has at least two polymerizable groups, the polyester has not only reinforcible ability but also cross-linkable ability. It is more preferable that the form stability of the resulting hydrogel is improved because the above polyester chain can be thoroughly cross-linked with poly-N-vinyllactam chain.

An example of polymerization form of polyester chains including terminal vinyl groups and poly-N-vinyl-pyrrolidone chains is shown

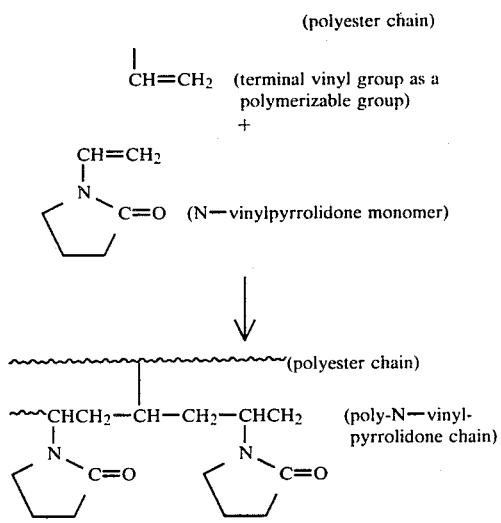

In the present invention, a polyester has a molecular weight of 1,000 to 100,000, preferably 4,000 to 40,000 and at least one polymerizable group in its molecule. As the above polyester, a grafted polyester is preferably employed, because the grafted polyester can increase a rubber hardness of the produced hydrogel and gives a hydrogel having a high strength though it has a high water-content.

A synthesis of grafted polymer by a reaction of an epoxy compound and a cyclic acid anhydride is preferable from viewpoint of control in molecular structure, as a result the reaction has an alternate-copolymerizable property. As an amount employed of an epoxy compound and a cyclic acid anhydride in the reaction, it is preferable to employ an equimolar amount of an epoxy compound and a cyclic acid anhydride, because the molecular structure is controlled by utilizing the alternate-copolymerizable property.

Epoxy compounds employed in the above synthesis of grafted polyester are selected from the following first to third groups. Amounts of the compounds are also shown.

THE FIRST GROUP

At least one epoxy compound is a member selected from the group consisting of cyclohexene oxide represented by the formula (I):

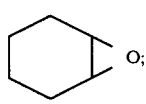

styrene oxide represented by the formula (II):

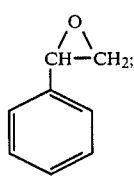

an epoxy compound represented by the formula (III):

wherein $R^1$ is a hydrogen atom or a linear, branched or cyclic alkyl group having 1 to 6 carbon atoms, which can be substituted with a halogen atom;
and an epoxy compound represented by the formula (VI):

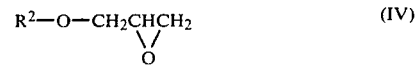

wherein $R^2$ is a member selected from the group consisting of linear, branched and cyclic alkyl groups having 1 to 6 carbon atoms, which can be substituted with a halogen atom or phenyl group.

Examples of the formula (III) or (IV) are, for instance, ethylene oxide, propylene oxide, 1,2-epoxybutane, 1,2-epoxypentane, 1,2-epoxyhexane, 1,2-epoxyheptane, 1,2-epoxyoctane, methyl glycidyl ether, ethyl glycidyl ether, propyl glycidyl ether, butyl glycidyl ether, pentyl glycidyl ether, hexyl glycidyl ether, phenyl glycidyl ether, and the like.

It is preferable that an amount of the compound is about 30 to about 95% by mole to the whole amount of epoxy compounds employed in the reaction.

THE SECOND GROUP

At least one of epoxy compound is a member selected from the group consisting of an epoxy compound represented by the formula (V):

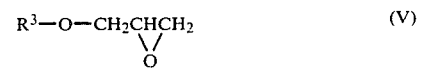

wherein $R^3$ is a member selected from the group consisting of vinyl group, allyl group, acryloyl group, methacryloyl group, a group having the formula (1):

wherein n is an integer of 2 to 50, a group having the formula (2):

wherein m is an integer of 2 to 50, and a group having the formula (3):

wherein l is an integer of 1 to 50 and an epoxy compound represented by the formula (VI):

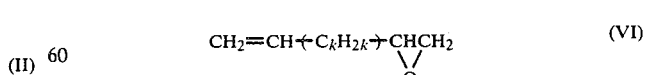

wherein k is 0 or an integer of 1 to 50.

Examples of the compound having the formula (V) are, for instance, allyl glycidyl ether, glycidyl acrylate, glycidyl methacrylate, vinylpoly(oxyethylene)glycidyl ether, vinylpoly(oxypropylene)glycidyl ether, and the like.

Examples of the compound having the formula (VI) are, for instance, 3,4-epoxy-1-butene, 4,5-epoxy-1-pentene, 5,6-epoxy-1-hexene, 6,7-epoxy-1-heptene, 7,8-epoxy-1-octene, 8,9-epoxy-1-nonene, 9,10,-epoxy-1-decene, and the like. It is preferable that the amount of the compound is about 5 to about 50% by mole to the whole amount of epoxy compounds employed in the reaction.

The use of the compound in an amount more than the above range is not preferable, because the amount of the introduced polymerizable group is increased and accordingly water content or rubber hardness (elongation) of the produced hydrogel is lowered as seen in general case where cross-linkable monomers are used too much.

THE THIRD GROUP

At least one of an epoxy compound is a member selected from the group consisting of an epoxy compound represented by the formula (VII):

wherein $R^4$ is a member selected from the group consisting of linear, branched and cyclic alkyl groups having 7 to 20 carbon atoms, which may be substituted with a halogen, and an epoxy compound represented by the formula (VIII):

wherein $R^5$ is a member selected from the group consisting of linear, branched and cyclic alkyl groups having 7 to 20 carbon atoms, which may be substituted with a halogen, and a group having the formula (4):

wherein $R^6$ is a member selected from the group consisting of linear, branched and cyclic alkyl groups having 1 to 20 carbon atoms, which may be substituted with a halogen, and phenyl group; and a is an integer of 5 to 50, and a group having the formula (5):

wherein $R^7$ is a member selected from the group consisting of linear, branched and cyclic alkyl groups having 1 to 20 carbon atoms, which may be substituted with a halogen, and phenyl group and b is an integer of 5 to 50.

Examples of the epoxy compound having the formula (VII), for instance, 1,2-epoxynonane, 1,2-epoxyundecane, 1,2-epoxytridecane, 1,2-epoxypentadecane, 1,2-epoxyheptadecane, 1,2-epoxyoctadecane, and the like.

Examples of the epoxy compound having the formula (VIII), for instance, long chain alkyl glycidyl ethers such as 2-ethylhexyl glycidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, heptadecyl glycidyl ether, octadecyl glycidyl ether and nonadecyl glycidyl ether; alkylpoly(oxyethylene)glycidyl ethers such as methylpoly(oxyethylene)glycidyl ether, propylpoly(oxyethylene)glycidyl ether, pentylpoly(oxyethylene)glycidyl ether, 2-ethylhexylpoly(oxyethylene)glycidyl ether, decylpoly(oxyethylene)glycidyl ether, dodecylpoly(oxyethylene)glycidyl ether and tetradecylpoly(oxyethylene)glycidyl ether; alkylpoly(oxypropylene)glycidyl ethers as are analogous to alkylpoly(oxyethylene)glycidyl ethers, phenylpoly(oxyethylene)glycidyl ethers; and phenylpoly(oxypropylene)glycidyl ethers, and the like.

It is preferable that an amount of the epoxy compound is 0 to about 30% by mole to the whole amount of epoxy compounds employed in the reaction. When the amount of the compound is more than the above range, a molecular weight of the polyester lowers and it is difficult to produce polyester having high molecular weight. As a result, the polyester cannot sufficiently reinforce N-vinyllactam polymer.

In the synthesis of the present invention, it is essential to employ the epoxy compounds of the above-mentioned second group, because it is necessary that at least one of polymerizable group was introduced into the produced polyester. Further, the use of the epoxy compounds including the third group which has $-(-C_2H_4O-)_{\overline{n}}$ group (n: at least 10) and the like can prevent lowering of the water content of the produced hydrogel and can increase elongation (rubber hardness) of the hydrogel. Particularly, strength of the hydrogel is remarkably increased by employing the epoxy compound having long chain alkyl group of the third group. The preferred cyclic anhydrides employed in the synthesis of the grafted polyesters are phthalic anhydride, tetrahydrophthalic anhydrides and derivatives thereof. It is not preferable to itaconic anhydride, citraconic anhydride, succinic anhydride or maleic anhydride, from viewpoint of producing the colorless and transparent hydrogel, because the produced polyester is colored by employing the above cyclic acid anhydride.

The reaction of the epoxy compound and the cyclic acid anhydride is carried out in solvent or non-solvent at about 60° to about 120° C., preferably at about 80° to about 100° C. for about 3 hours to about 10 days, in the presence of catalyst.

Examples of the catalyst employed in the reaction are, for instance, basic catalysts such as a tertiary amine having the formula (6):

wherein $R^8$, $R^9$ and $R^{10}$ are the same or different alkyl group having 1 to 6 carbon atoms, benzyl group or pyridine; a basic salt of benzoic acid, lithium bromide, Al(alkoxy)$_3$, a quaternary ammonium salt, a quaternary phosphonium salt, and the like. Examples of the basic catalyst are, for instance, dimethylbenzylamine, dimethylaminopyridine, and the like. Examples of the quaternary ammonium salt are, for instance, trimethylbenzyl ammonium chloride, triethylbenzyl ammonium chloride, tetrabutyl ammonium boride, and the like. Examples of the quaternary phosphonium salt are, for instance, tetrabutyl phosphonium bromide, and the like.

It is preferable that an amount of the catalyst is about 0.1 to about 5% by mole to the whole amount of the cyclic acid anhydride employed in the reaction. When the amount is more than the above range, it tends to lower molecular weight of the produced polyester.

When the amount is less than the above range, the reaction cannot efficiently progress to decrease the yield of the produced polyester.

As a solvent employed in the above reaction, it is possible to employ solvents which can dissolve the epoxy compounds aand the cyclic acid anhydride employed in the reaction. It is preferable that examples of the solvents are, for instance, toluene, benzene, xylene, 1,2-dichloroethane, and the like. However alcohols such as methanol or ethanol cannot be employed in the reaction, because such alcohols react with the epoxy compounds or cyclic acid anhydride.

In the above reaction, inhibitors generally used such as hydroquinione can be employed as occasion demands.

The polyester produced by the above reaction is colorless in a state of solution and the transparency of the above solution is excellent and is a white powder when dry. The molecular weight of the polyester is analyzed by gel permeation chromatography (hereinafter referred to as "GPC"), (Trirotor III GPC (made by Japan Spectroscopic Co., Ltd.), detector: Shodex RI SE-31 (made by Showa Denko Kabushiki Kaisha), column: Shodex PAK A-80 (made by Showa Denki Kabushiki Kaisha), flow rate: 1.0 ml/min., column temperature: 40° C., medium: tetrahydrofuran) to give a range of about 1,000 to 100,000. The molecular weight of polyester influences upon a mechanical property of hydrogel. The larger molecular weight of polyester, the stronger mechanical property of hydrogel and the polyester itself can be advantageously separated and purified. The range of a preferable molecular weight is 4,000 to 40,000.

Examples of the N-vinyllactam employed in the invention are, for instance, N-vinylpyrrolidone, N-vinylpiperidone, N-vinylcaprolactam, and the like; or a cyclic lactam thereof substituted with a lower alkyl group having 1 to 4 of carbon atoms. However it is not limited to the above-mentioned compounds. The N-vinyllactam can be employed alone or in the admixture thereof.

N-vinylheterocyclic compounds such as N-vinylpyridine and N-vinylsuccinimide which have N-vinyl group and a polymerizable group, and the polymer thereof are hydrophilic; and α-methylene N-methylpyrrolidone which has the same property as that of N-vinyllactam can be employed together with or instead of N-vinyllactam.

The hydrogel forming material is produced by polymerizing the above polyester having a polymerizable group in its molecule and N-vinyllactam in a weight ratio of about 3:about 97 to about 60:about 40, preferably about 10:about 90 to about 30:about 70. When the polyester is employed in a large proportion within the above range or when it is desired to admix easily and uniformly the polyester and N-vinyllactam, it is preferable to carry out the following method.

A predetermined amount of purified polyester (which may be either solid or liquid) is dissolved in a halogenated hydrocarbon such as dichloromethane or chloroform; or a volatile solvent having a low boiling point such as acetone, which can be easily removed after the admixing of the polyester and N-vinyllactam, and then a predetermined liquid N-vinyllactam is added into the above solution. After the polyester and N-vinyllactam are uniformly dissolved, the above solvent is evaporated, and then a polymerization initiator is added to the polyester mixture to heat-polymerize. When the polymer is formed into a film, a solvent such as dimethylsulfoxide may be employed for lowering the viscosity of the mixture of polyester and N-vinyllactam.

Examples of the above polymerization initiator are, for instance, azo-compounds and peroxides such as 2,2'-azobis(2,4-dimethyl-valeronitrile), 2,2'-azobis(4-methoxy-2,4-dimethylvaleronitrile), azobisisobutyronitrile, benzoylperoxide, t-butylhydroperoxide and cumenehydroperoxide; a redox initiator; and the like. Among them, it is preferable to employ 2,2'-azobis(2,4-dimethylvaleronitrile) and 2,2'-azobis(4-methoxy-2,4-dimethylvaleronitrile), which are capable of initiating polymerization at a low temperature.

An amount of the initiator is about 0.001 to about 2% by weight to the whole amount of the compounds employed in the reaction, preferably about 0.01 to about 0.5% by weight.

Although a method of the polymerization is not limited, it is preferable to employ a temperature-elevation method. In general, the polymerization is preferably carried out at room temperature to 120° C., especially 25° to 80° C. for several hours to several tens of hours.

In the invention, it is preferable that 2 or 3 kinds of polyesters, each of which have a different property are employed in combination within the above range for obtaining a more excellent hydrogel in various properties such as a mechanical property, optical property and water content.

In the present invention, the hydrogel obtained by impregnating the hydrogel forming material with water has an excellent transparency and a wide water content from lower water content to higher water content. Particularly, the present invention can overcome the conventional disadvantages that the hydrogel becomes cloudy or the strength of hydrogel lowers in case of high water content, and provides a hydrogel having a high water content and excellent transparency and strength. The above effects are caused by employing the polyester which is easily polymerizable to a N-vinyllactam having a large hydrophilic property and has a polymerizable group in its molecule.

The hydrogel forming material of the invention can be preferably utilized for various medical materials, particularly for water-containable contact lenses, because the hydrogel has an excellent crosslinkable property and transparency and the N-vinyllactam polymer is hardly eluted.

The shaping of the hydrogel forming material into water-containable contact lenses can be made by a usual polymerization techinique and a molding technique. That is to say, the obtained hydrogel forming material can be subjected to a cutting or polishing processing to give a contact lens shape; or polymerization of the polyester and N-vinyllactam can be conducted in a mold corresponding to the predetermined shape of contact lens to give a contact lens shape.

The present invention is more specifically described and explained by means of the following Examples. It is to be understood that the present invention is not limited to Examples, and various changes and modifications may be made in the invention without departing from the spirit and scope thereof.

REFERENCE EXAMPLE 1

Synthesis of Polyester Having Polymerizable Group in its Molecule, Which is Employed in the Present Invention A space in a 100 ml flask provided with a Dimroth condenser was purged with argon gas. The flask was charged with 14.81 g (0.1 mole) of phthalic anhydride (made by Wako Purechemical Industries, Ltd.), 7.87 g (0.08 mole) of cyclohexeneoxide (made by Tokyo Kasei Kogyo Co., Ltd.), 2.49 g (0.01 mole) of a long chain alkyl glycidyl ether (a mixture of 55% by weight of dodecyl glycidyl ether and 45% by weight of tridecyl glycidyl ether, made by Kyoeisha Yushikagaku Kogyo Kabushiki Kaisha), and 1.15 g (0.01 mole) of allyl glycidyl ether together with 10 ml of toluene as a medium and 0.14 g of dimethylbenzylamine as a catalyst, and the reaction was carried out at 90° C. for 12 hours with agitation. After the reaction mixture was allowed to cool the obtained viscous liquid was dissolved in about 100 ml of dichloromethane or chloroform, and then the resulting liquid was added 3 l of mixture of n-hexane and diethylether (1:1) to produce a precipitate. After the filtration, the obtained solid was dried at 40° C. under reduced pressure to give 23.66 g of white solid.

The molecular weight of the obtained polyester was measured by GPC. A number average molecular weight (hereinafter referred to as "$\overline{Mn}$") of the polyester is 9,100 and a weight average molecular weight (hereinafter referred to as "$\overline{Mw}$" of the polyester is 11,700.

The results are shown in Table 1. The measurement of molecular weight by GPC is carried out by using a Trirotor III analyzer (made by Japan Spectroscopic Co., Ltd.) (detector: Shodex RI SE-31; column: Shodex PAK G.P.C. A-80M (made by Showa Denko Kabushiki Kaisha); medium: tetrahydrofuran) in conditions of a column temperature of 40° C. and a flow rate of 1.0 ml/min.

REFERENCE EXAMPLES 2 TO 9

A mixed solution prepared so as to be the composition and amount shown in Table 1 was subjected to polymerization reaction in the condition of Table 1 in the same manner as in Reference Example 1. The obtained polyesters were measured in the same manner as in Reference Example 1.

However, in case that a compound having methacryloyl group or acryloyl group was employed as an epoxy compound having a polymerizable group, a little amount of polymerization-inhibitor was employed for protecting the polymerizable group since the reactivity of the group is high.

The results are shown in Table I.

TABLE 1

| | Starting material of polyester | | | | | | | | | |
|---|---|---|---|---|---|---|---|---|---|---|
| | Epoxy compounds (millimole) | | | | | | | | Cyclo acid anhydrides (millimole) | |
| | The first group | | The second group | | The third group | | | | | |
| Ref. Ex. No. | Phenyl glycidyl ether | Cyclo- hexene- oxide | Allyl glycidyl ether | Methacryl glycidyl ether | 2-Ethylhexyl glycidyl ether | Phenol (EO)$_5$ glycidyl ether[1] | Long chain alkyl ether[2] | Dodecyl- alcohol (EO)$_5$ glycidyl ether[3] | Phtalic anhy- dride | Tetra- hydrophtalic anhydride |
| 1 | | 80 | 10 | | | | 10 | | 100 | |
| 2 | | 70 | 10 | | 20 | | | | 100 | |
| 3 | | 80 | 10 | | | | | 10 | 100 | |
| 4 | | 70 | 10 | | | | | 20 | 100 | |
| 5 | | 60 | 10 | | | | | 30 | 100 | |
| 6 | 95 | | 5 | | | | | | 100 | |
| 7 | | 95 | | 5 | | | | | 100 | |
| 8 | | 90 | 10 | | | | | | | 100 |
| 9 | | 60 | 10 | | | 30 | | | 100 | |

| | Condition of synthesis | | | | | | Properties of the produced polyesters | | | |
|---|---|---|---|---|---|---|---|---|---|---|
| | Catalyst (millimole) | | | | | | | | | |
| Ref. Ref. No. | Dimethyl- benzylamine | Tetrabutyl- ammonium- bromide | Solvent (ml) Toluene | Inhibitor (millimole) Hydroquinone | Reaction condition | | | | Polydispersibility ($\overline{Mw}/\overline{Mn}$) | Transparency |
| | | | | | Temperature (°C.) | Time (hr.) | $\overline{Mn}$ | $\overline{Mw}$ | | |
| 1 | 1 | | 10 | | 90 | 12 | 9,100 | 11,700 | 1.29 | Good |
| 2 | 1 | | 10 | | 88 to 94 | 13.5 | 11,900 | 14,600 | 1.23 | Good |
| 3 | 1 | | 10 | | 90 | 13.5 | 6,900 | 11,200 | 1.62 | Good |
| 4 | 1 | | 10 | | 84 to 92 | 11.5 | 5,600 | 9,400 | 1.68 | Good |
| 5 | 1 | | 10 | | 85 to 93 | 14 | 5,300 | 10,200 | 1.92 | Good |
| 6 | 1 | | 10 | | 90 | 15 | 17,600 | 22,000 | 1.25 | Good |
| 7 | | 1 | 10 | 0.7 | 90 | 5 | 7,800 | 9,500 | 1.22 | Good |
| 8 | 1 | | 10 | | 90 | 15.5 | 1,150 | 1,250 | 1.09 | Good |
| 9 | 1 | | 10 | | 82 to 94 | 13 | 4,000 | 6,000 | 1.50 | Good |

Note:

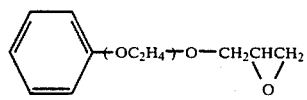

(1)

(2) A mixture of 55% by weight of $C_{12}H_{25}$—OCH$_2$CHCH$_2$ and 45% by weight of $C_{13}H_{27}$—O—CH$_2$CHCH$_2$
$\phantom{XXXXXXXXXXXXXXXXXXXXXXXXXXXX}\diagdown\!\diagup\phantom{XXXXXXXXXXXXXXXXXXXXX}\diagdown\!\diagup$
$\phantom{XXXXXXXXXXXXXXXXXXXXXXXXXXXXX}O\phantom{XXXXXXXXXXXXXXXXXXXXXXXX}O$ (3) $C_{12}H_{25}\!-\!(\!OC_2H_4\!)_{\overline{15}}\!-\!OCH_2CHCH_2$
$\phantom{XXXXXXXXXXXXXXXXX}\diagdown\!\diagup$
$\phantom{XXXXXXXXXXXXXXXXXX}O$

REFERENCE EXAMPLE 10

In the same manner as in Reference Example 1, a flask was charged with 74.4 g (0.5 mole) of phthalic anhydride, 39.5 g (0.4 mole) of cyclohexeneoxide, 12,5 g (0.05 mole) of long chain alkyl glycidyl ether and 5.75 g (0.05 mole) of allyl glycidyl ether together with 50 ml of toluene as a medium and 0.34 g of tetrabutylphosphonium bromide as a catalyst, and then the mixture was reacted at 90° C. for 7 days. After the resultant was allowed to cool, the obtained viscous liquid was dissolved in 500 ml of dichloromethane or chloroform. And then the resulting liquid was added to 15 l of methanol to give a precipitate. After the filtration of the obtained solid was dried at 40° C. under reduced pressure to give 134.5 g of white solid.

The molecular weight of the obtained polyester was measured by GPC. $\overline{Mn}$ of the polyester was 38,300, $\overline{Mw}$ of the polyester was 53,600, and $\overline{Mw}/\overline{Mn}$ was 1.40.

EXAMPLE 1

Three g of white polyester powder obtained in Reference Example 1 was dissolved in 5 ml of methylene chloride, and 7 g of N-vinylpyrrolidone (made by Wako Purechemical Industries, Ltd.) was uniformly admixed to the solution. And then methylene chloride was removed under reduced pressure from the solution, and thereto 0.02 g of 2,2'-azobis(4-methoxy-2,4-dimethylvaleronitrile) as a polymerization-initiator was added.

After the obtained solution was poured onto a space between glass plates to form a film, the film was heated to polymerize in a thermostat having an inner temperature of 30° C. for 24 hours and a thermostat having an inner temperature of 60° C. for 24 hours to give a colorless and transparent film. The obtained film was impregnated and swelled with water to obtain a filmy hydrogel.

With respect to the obtained film having a thickness of 0.2 mm and a diameter of 15 mmφ, water content, visible ray percent transmission, elongation ratio and oxygen permiability were measured by the following methods. The results are shown in Table 2.

Water Content

The weight if equilibrium wet film and the weight of dry film were measured. The water content (%) was calculated on the basis of the following formula:

$$\text{Water content (\%)} = \frac{\text{(Weight of equilibrium wet film)} - \text{(Weight of dry film)}}{\text{Weight of equilibrium wet film}} \times 100$$

Visible Ray Percent Transmission

Visible ray percent transmission in a visible range of 380 to 780 nm was measured by Shimadzu UV-240 Recording Spectrophotometer (made by Shimadzu Corporation).

Needle Penetration Strength (g)

A round head of pressure needle having a diameter of 1.5 mm was put on the center of the film specimen impregnated with water and a weight value (g) was measured at the time when the specimen was penetrated.

Elongation Ratio (%)

Elogation ratio of the film was measured at the time when needle penetration strength was measured.

Oxygen Permeability

Oxygen permeability ($\times 10^{-10}$ ml $O_2 \cdot cm/cm^2 \cdot sec \cdot mmHg$) was measured at 35° C. in 0.9% physiological saline by a film-oxygen gas permeater of Seikaken type (made by Rikaseiki Kogyo Kabushiki Kaisha)

EXAMPLES 2 TO 20

The procedures of Example 1 were repeated except that the kinds and amounts of components were changed as shown in Table 2 to give a hydrogel. The water content and visible ray percent transmission of the obtained hydrogel were measured in the same manner as in Example 1.

The results are shown in Table 2.

TABLE 2

| Ex. No. | Starting material (parts by weight) | | | | | | | | | N—vinyllactam N—vinyl-pyrrolidone | Condition | | Initiator (% by weight) V-70[1] |
|---|---|---|---|---|---|---|---|---|---|---|---|---|---|
| | Polyester | | | | | | | | | | Temperature (°C.) | Time (hr.) | |
| | Ref. Ex. 1 | Ref. Ex. 2 | Ref. Ex. 3 | Ref. Ex. 4 | Ref. Ex. 5 | Ref. Ex. 6 | Ref. Ex. 7 | Ref. Ex. 8 | Ref. Ex. 9 | | | | |
| 1 | 30 | | | | | | | | | 70 | at 30° C. for 24 hr. / at 60° C. for 24 hr. | | 0.2 |
| 2 | 20 | | | | | | | | | 80 | at 30° C. for 24 hr. / at 60° C. for 24 hr. | | " |
| 3 | 10 | | | | | | | | | 90 | at 30° C. for 24 hr. / at 60° C. for 24 hr. | | " |
| 4 | | 30 | | | | | | | | 70 | at 30° C. for 24 hr. / at 60° C. for 24 hr. | | " |
| 5 | | 20 | | | | | | | | 80 | at 30° C. for 24 hr. / at 60° C. for 24 hr. | | " |
| 6 | | 10 | | | | | | | | 90 | at 30° C. for 24 hr. / at 60° C. for 24 hr. | | " |
| 7 | | | 30 | | | | | | | 70 | at 30° C. for 24 hr. / at 60° C. for 24 hr. | | " |
| 8 | | | 40 | | | | | | | 60 | at 30° C. for 24 hr. / at 60° C. for 24 hr. | | " |
| 9 | | | 50 | | | | | | | 50 | at 30° C. for 24 hr. / at 60° C. for 24 hr. | | " |
| 10 | 10 | | 20 | | | | | | | 70 | at 30° C. for 24 hr. | | 0.3 |

TABLE 2-continued

| Ex. No. | | | | | | | | Conditions | |
|---|---|---|---|---|---|---|---|---|---|
| 11 | 10 | 10 | | | | | 80 | at 30° C. for 24 hr. / at 60° C. for 24 hr. | 0.3 |
| 12 | | 10 | 20 | | | | 70 | at 30° C. for 24 hr. / at 60° C. for 24 hr. | " |
| 13 | | 10 | 10 | | | | 80 | at 30° C. for 24 hr. / at 60° C. for 24 hr. | " |
| 14 | 5 | | 15 | | | | 80 | at 30° C. for 24 hr. / at 60° C. for 24 hr. | " |
| 15 | | 5 | 15 | | | | 80 | at 30° C. for 24 hr. / at 60° C. for 24 hr. | " |
| 16 | | | | 30 | | | 70 | at 30° C. for 24 hr. / at 60° C. for 24 hr. | 0.4 |
| 17 | | | | | 30 | | 70 | at 30° C. for 24 hr. / at 60° C. for 24 hr. | 0.4 |
| 18 | | | 20 | | | | 80 | at 30° C. for 24 hr. / at 60° C. for 24 hr. | 0.3 |
| 19 | | | | | 30 | | 70 | at 30° C. for 24 hr. / at 60° C. for 24 hr. | 0.2 |
| 20 | | | | | | 30 | 70 | at 30° C. for 24 hr. / at 60° C. for 24 hr. | 0.3 |

| Ex. No. | Water content (% by weight) | Transparency of water-contained hydrogel | Visible ray percent transmission (%) | Needle penetration strength (g) | Elongation ratio (%) | Oxygen permeability × $10^{-10}$ ml $O_2 \cdot$ cm/cm$^2 \cdot$ sec $\cdot$ mmHg |
|---|---|---|---|---|---|---|
| 1 | 64.4 | Good | >97 | 308 | 37.5 | 3.2 |
| 2 | 73.4 | " | >99 | 194 | 37.5 | 3.9 |
| 3 | 83.4 | " | >99 | 64 | 46.4 | 4.3 |
| 4 | 63.2 | " | >96 | 345 | 33.2 | 3.0 |
| 5 | 71.6 | " | >98 | 157 | 41.9 | 3.2 |
| 6 | 82.2 | " | >99 | 60 | 37.5 | 5.6 |
| 7 | 67.7 | " | >96 | 153 | 41.9 | 4.0 |
| 8 | 65.0 | " | >95 | — | — | — |
| 9 | 58.8 | " | >90 | — | — | — |
| 10 | 69.0 | " | >96 | 191 | 46.4 | 3.0 |
| 11 | 75.1 | " | >99 | 142 | 60.8 | 4.2 |
| 12 | 68.7 | " | >95 | — | — | — |
| 13 | 74.7 | " | >98 | — | — | — |
| 14 | 76.6 | " | >98 | — | — | — |
| 15 | 76.5 | " | >99 | — | — | — |
| 16 | 73.7 | " | >99 | — | — | — |
| 17 | 79.3 | " | >98 | — | — | — |
| 18 | 78.7 | " | >99 | 112 | 70.8 | 3.9 |
| 19 | 70.0 | " | >93 | — | — | — |
| 20 | 69.0 | " | >98 | — | —. | — |

Note:
(1)2,2-azobis(4-methoxy-2,4-dimethylvaleronitrile)

In addition to the ingredients employed in Examples, other ingredients can be employed in Examples as set forth in the specification to obtain substantially the same results.

What we claim is:

1. An optically transparent hydrogel forming material comprising a copolymer of (A) an optically transparent polyester having a number average molecular weight of 1,000 to 100,000 and at least one polymerizable group in its molecule and (B) an N-vinyllactam, said copolymer being prepared by reacting
   (a) a polyester having a ratio of weight average molecular weight to number average molecular weight between 1.05 and 1.95 with
   (b) an N-vinyllactam in the presence of a catalyst;
said polyester being formed by polymerizing
   (1) 30 to 95 mole percent, based on total epoxy compounds, of an epoxy compound selected from the group consisting of cyclohexene oxide represented by the formula (I):

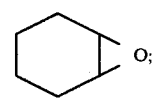

(I)

styrene oxide represented by the formula (II):

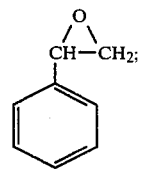

(II)

an epoxy compound represented by the formula (III):

$$R^1-CH-CH_2 \atop \diagdown\!\!\diagup \atop O \qquad (III)$$

wherein $R^1$ is hydrogen atom or alkyl group having 1 to 6 carbon atoms; and
an epoxy resin compound represented by the formula (IV):

$$R^2-O-CH_2CHCH_2 \atop \diagdown\!\!\diagup \atop O \qquad (IV)$$

wherein $R^2$ is an alkyl group having 1 to 6 carbon atoms or phenyl group;

(2) 5 to 50 mole percent of an epoxy compound selected from the group consisting of an epoxy compound represented by the formula (V):

$$R^3-O-CH_2CHCH_2 \atop \diagdown\!\!\diagup \atop O \qquad (V)$$

wherein $R^3$ is a member selected from the group consisting of vinyl group, allyl group, acryloyl group, methacryloyl group, a group having the formula (1):

$$CH_2=CH+OC_2H_4\overline{)_n} \qquad (1)$$

wherein n is an integer of 2 to 50, a group having the formula (2):

$$CH_2=CH+OC_3H_6\overline{)_m} \qquad (2)$$

wherein m is an integer of 2 to 50 and a group having the formula (3):

$$CH_2=CHOC_lH_{2l}- \qquad (3)$$

wherein l is an integer of 1 to 50, and an epoxy compound represented by the formula (VI):

$$CH_2=CH+C_kH_{2k}+CHCH_2 \atop \diagdown\!\!\diagup \atop O \qquad (VI)$$

wherein k is 0 or an integer of 1 to 50; and (3) 0 to 30 mole percent of an epoxy compound selected from the group consisting of an epoxy compound represented by the formula (VII):

$$R^4-CHCH_2 \atop \diagdown\!\!\diagup \atop O \qquad (VII)$$

wherein $R^4$ is an alkyl group having 7 to 20 carbon atoms and an epoxy compound represented by the formula (VIII):

$$R^5-OCH_2CHCH_2 \atop \diagdown\!\!\diagup \atop O \qquad (VIII)$$

wherein $R^5$ is a member selected from the group consisting of an alkyl group having 7 to 20 carbon atoms, a group having the formula (4):

$$R^6+OC_2H_4\overline{)_a} \qquad (4)$$

wherein $R^6$ is a member selected from the group consisting of an alkyl group having 1 to 20 of carbon atoms and a phenyl group and a is an integer of 5 to 50 and a group having the formula (5):

$$R^7+OC_3H_6\overline{)_b} \qquad (5)$$

wherein $R^7$ is a member selected from the group consisting of an alkyl group having 1 to 20 carbon atoms and a phenyl group and b is an integer of 5 to 50;
with
(4) one or more cyclic acid anhydrides selected from the group consisting of phthalic anhydride, tetrahydrophthalic anhydride and derivatives thereof.

2. The hydrogel forming material of claim 1, wherein said polyester has a number average molecular weight of 4,000 to 40,000.

3. The hydrogel forming material of claim 1, wherein said polyester is a grafted polyester.

4. The hydrogel forming material of claim 1, wherein said N-vinyllactam is N-vinylpyrrolidone, N-vinyl piperidone or N-vinylcaprolactam.

5. A hydrogel comprising an optically transparent hydrogel forming material according to claim 1 and water in an amount between 50 and 90% by weight of said hydrogel forming material.

6. A hydrogel according to claim 5 having a visible ray percent transmission of not less than 90%.

* * * * *

UNITED STATES PATENT AND TRADEMARK OFFICE
CERTIFICATE OF CORRECTION

PATENT NO. : 4,699,946
DATED : October 13, 1987
INVENTOR(S) : YANAGIHARA et al

It is certified that error appears in the above-identified patent and that said Letters Patent is hereby corrected as shown below:

Column 4, line 54, amend "$CH_2=CHOH_\ell H_{2\ell}$" to --$CH_2=CHOC_\ell H_{2\ell}$--.

Column 7, line 6, amend "aand" to --and--.

Column 7, line 24, amend "Showa Denki" to --Showa Denko--.

Signed and Sealed this

Twelfth Day of April, 1988

Attest:

DONALD J. QUIGG

Attesting Officer

Commissioner of Patents and Trademarks